Patented Apr. 10, 1934

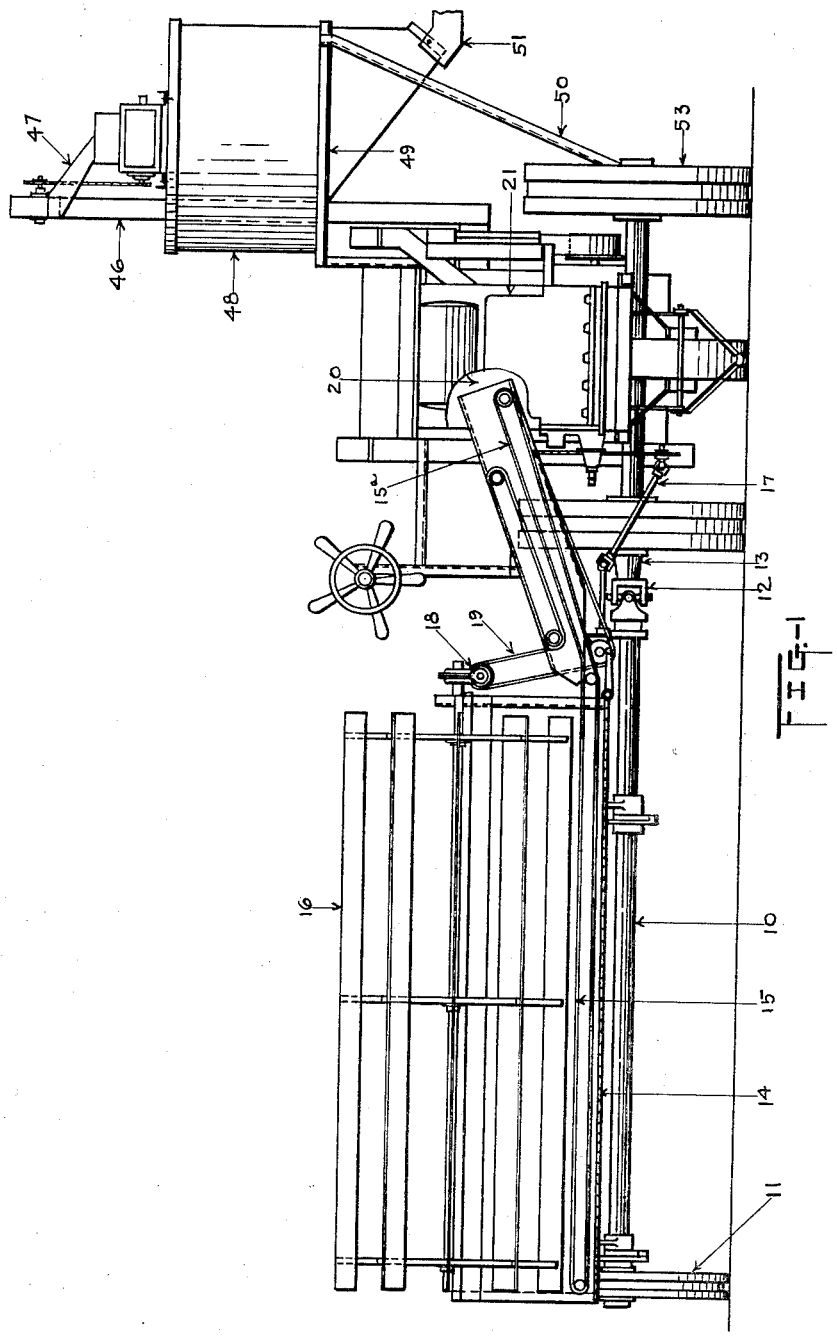

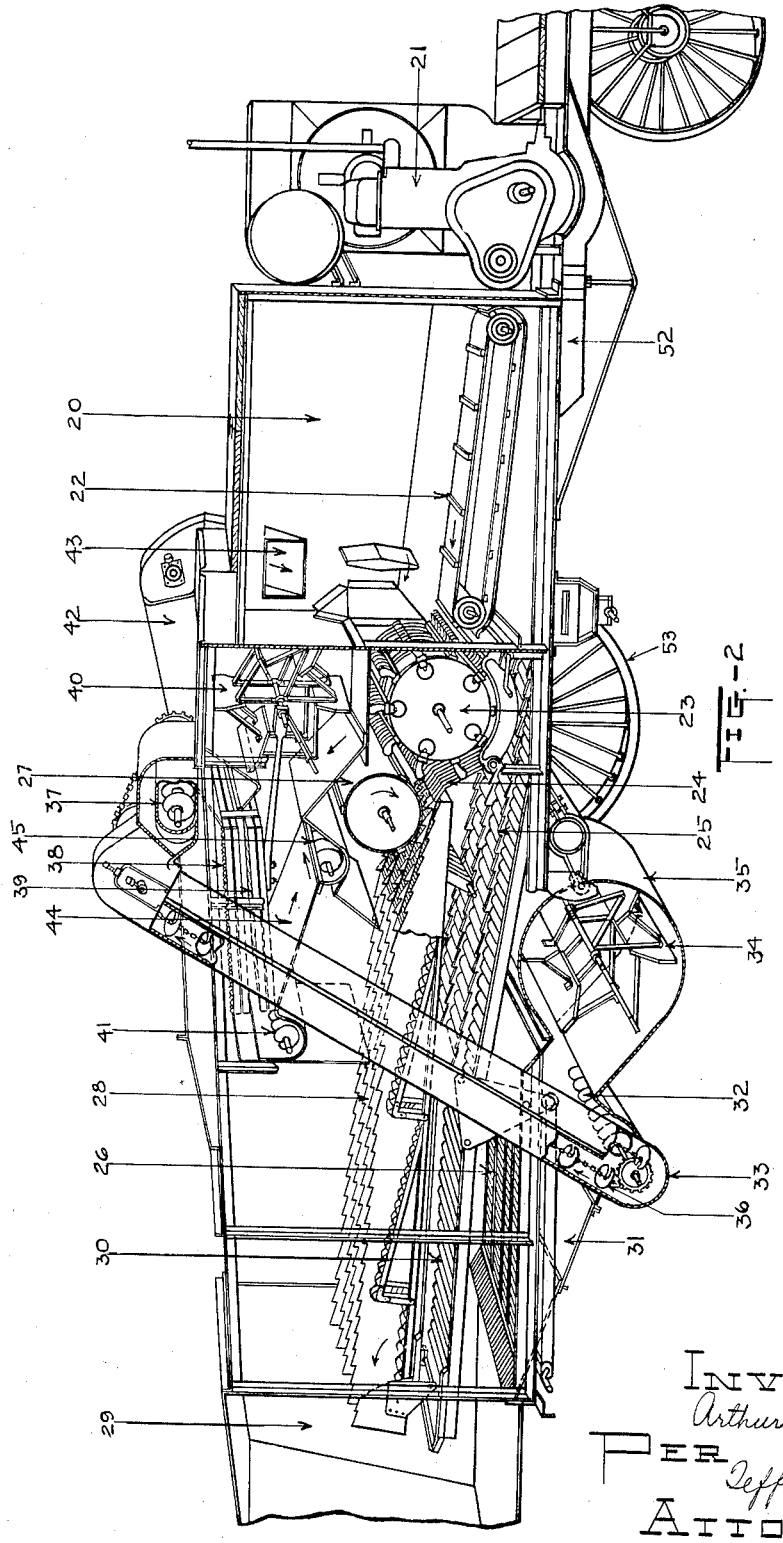

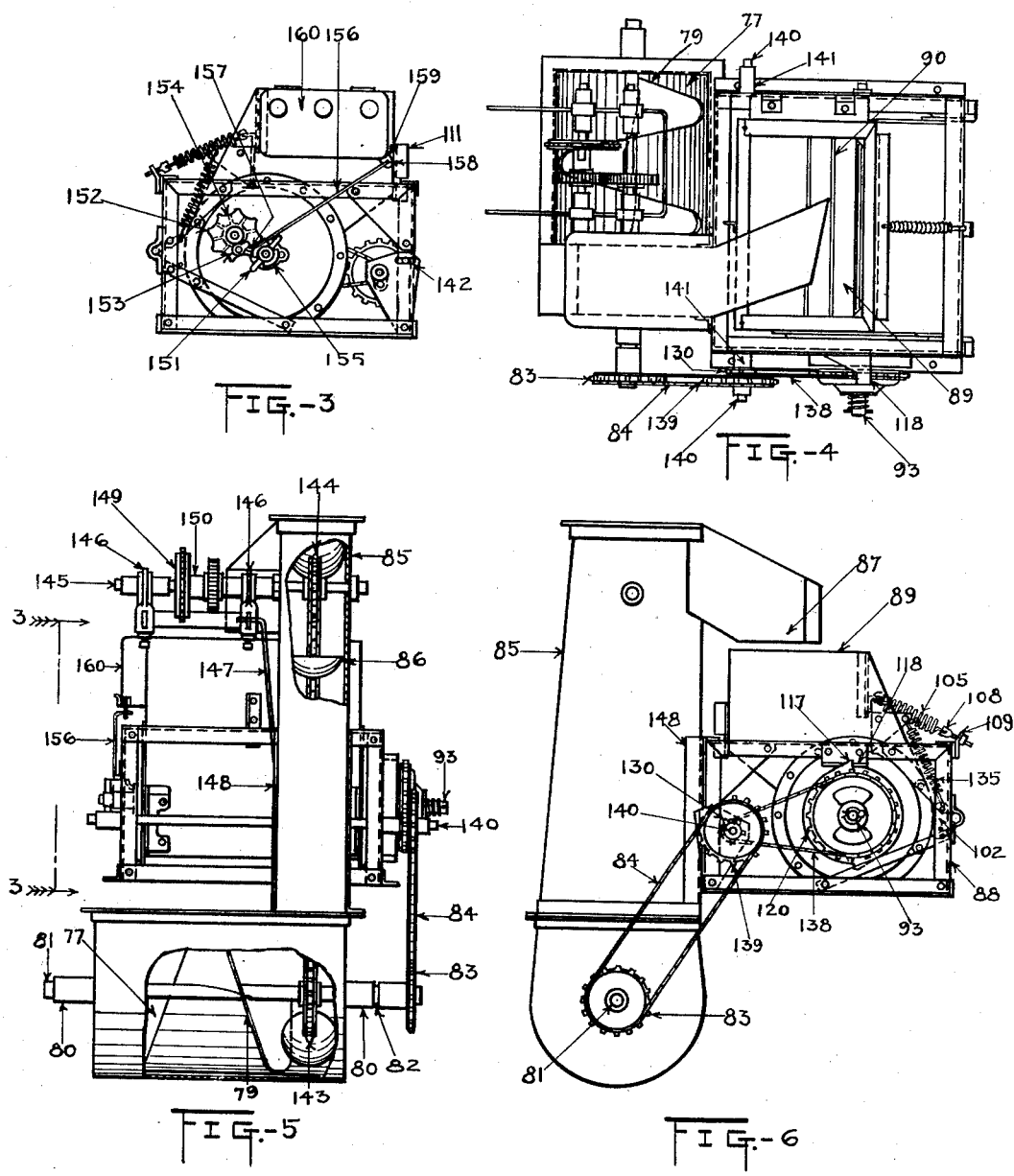

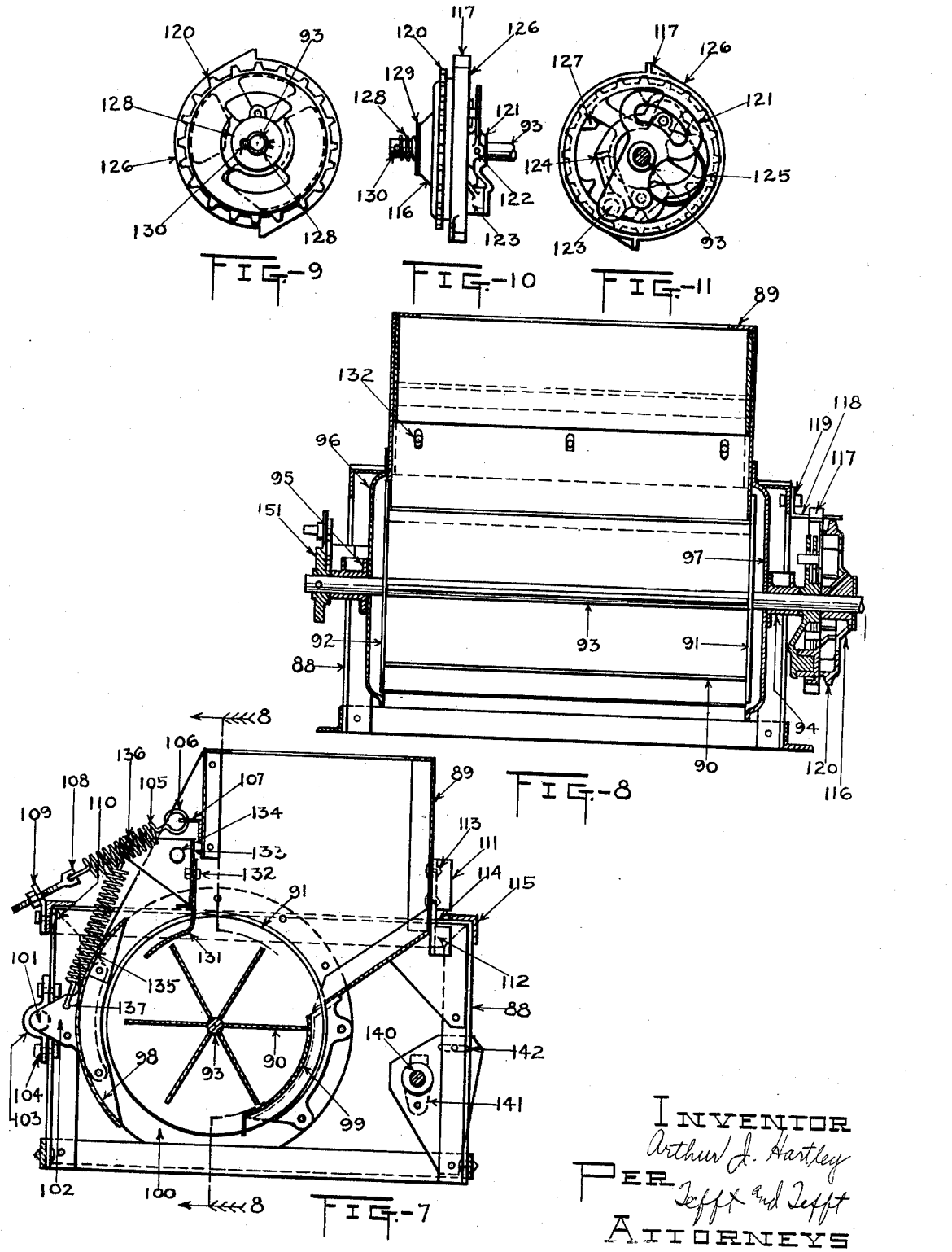

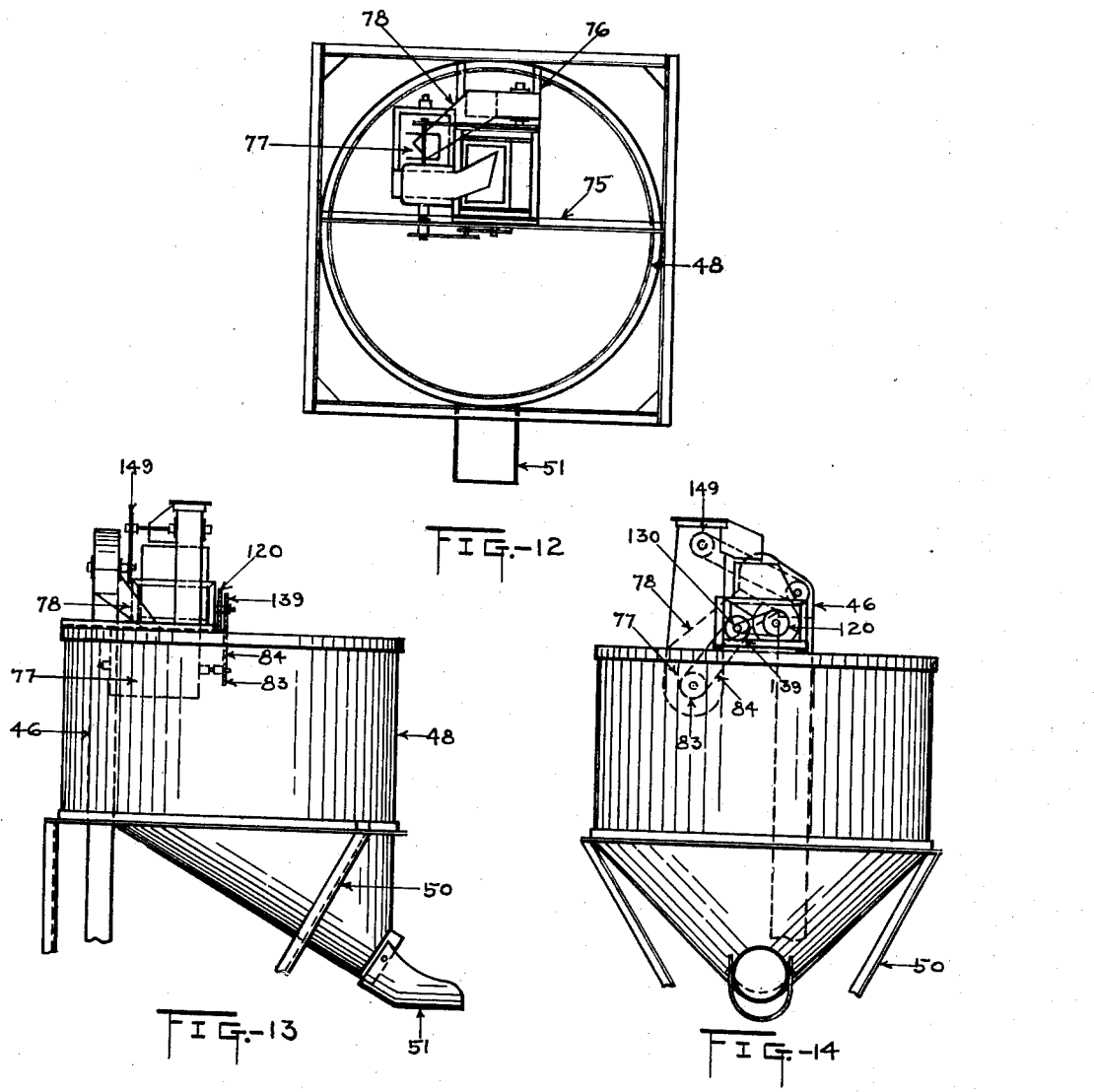

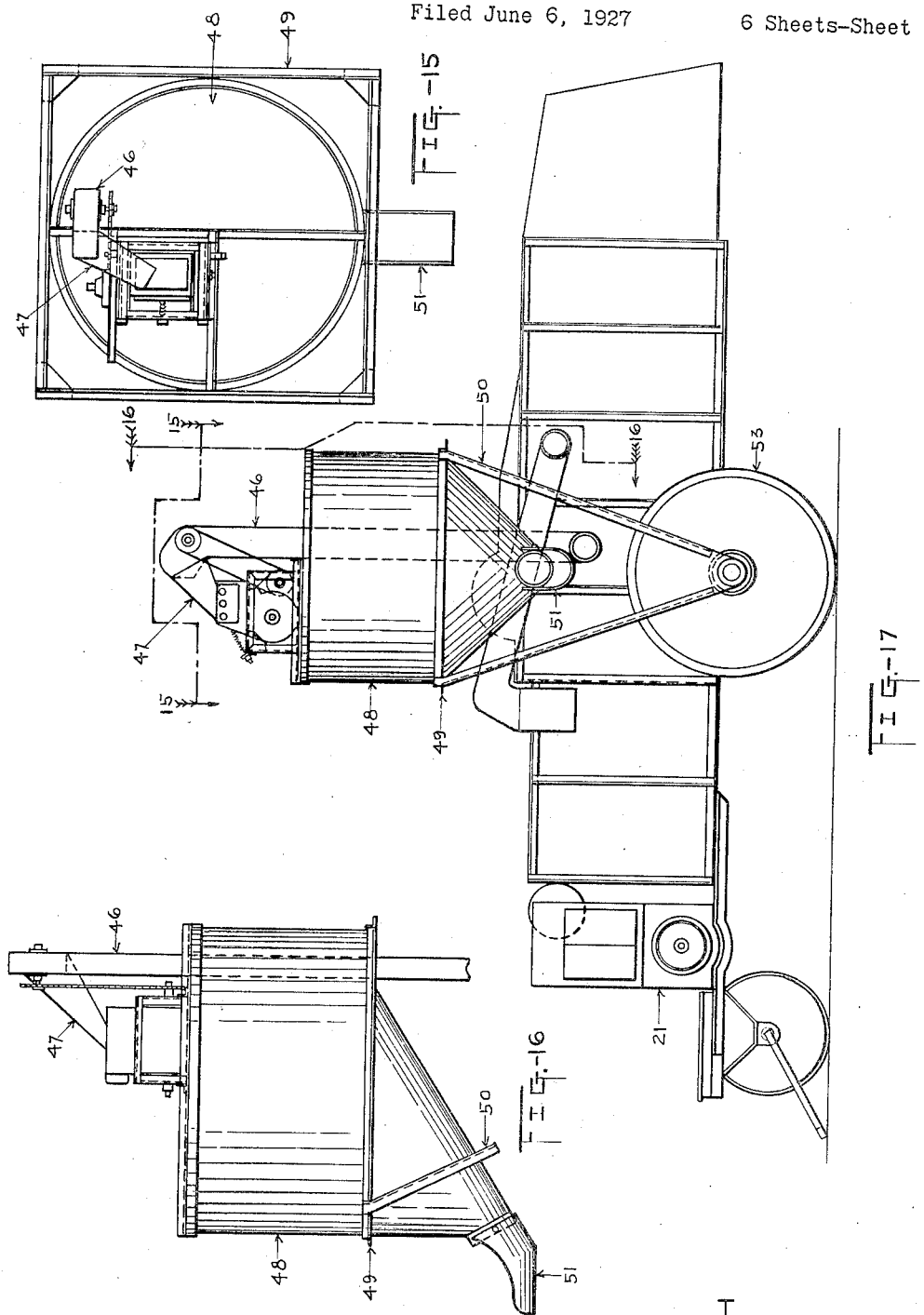

1,954,479

UNITED STATES PATENT OFFICE 1,954,479

COMBINED HARVESTING, THRESHING, AND GRAIN MEASURING DEVICE

Arthur J. Hartley, Peoria, Ill.

Application June 6, 1927, Serial No. 196,716

11 Claims. (Cl. 56—20)

This invention relates to combined harvesting, threshing and grain measuring devices.

One of the objects of the invention is in the provision of a machine that combines harvesting, threshing and grain measuring mechanism in such manner that the machine, in moving through the field, can automatically accomplish the three operations while in transit.

Another object is in the combining of a grain metering or measuring device with a harvesting and threshing machine with the result that the grain measuring operation may be accomplished automatically with the harvesting and threshing operations.

Still another object is in the provision of a grain metering or measuring device, which may be attached to the well known combined harvesting and threshing machine in such manner that the grain measuring operation may occur simultaneously with the harvesting and threshing operation.

A further object is in the provision of a grain measuring device of such nature that same may be combined with the well known harvesting and threshing machine and operate simultaneously therewith during the passage of the machine through the field, said grain measuring device being adapted to operate efficiently irrespective of the movement of the device and the irregularities of the ground.

A still further object lies in the provision of a grain metering device that is adapted to be associated with the elevating mechanism of a combined harvesting and threshing machine in a manner to simultaneously measure the threshed grain, and thereby increase the efficiency of an otherwise superior and efficient machine.

Yet a further object lies in the provision of a grain measuring device adapted to be associated with the grain elevating mechanism of a combined harvester and thresher, said measuring device being constructed in such manner that the irregular movement of the combined machine will not affect the efficiency of the measuring operation.

An additional object lies in the provision of a grain measuring device adapted to be associated with the well known combined harvesting and threshing machine, the operation of said measuring device being controlled by the accumulation of a determined volume of grain rather than by the weight thereof, thus causing same to operate efficiently, irrespective of the irregular travel of the comibned machine over the ground.

Other object will appear in the following specification taken in connection with the annexed drawings, in which—

Fig. 1 is a front elevation of a combined harvester, thresher and grain measuring device;

Fig. 2 is a perspective view, partially in cross-section, showing the general arrangement of the operating portions of a threshing machine;

Fig. 3 is an end elevation of applicant's grain measuring device;

Fig. 4 is a plan view of applicant's grain measuring device, including the auxiliary elevator and receiving portion;

Fig. 5 is a rear elevation of the grain measuring device shown in Fig. 4;

Fig. 6 is an end elevation thereof;

Fig. 7 is a cross-sectional view showing in detail the arrangement of the grain meter with respect to the pivoted hopper;

Fig. 8 is a sectional view taken on the line 8—8 of Fig. 7;

Fig. 9 is a side elevation of the clutch;

Fig. 10 is a front elevation thereof;

Fig. 11 is a side elevation, partially in section, showing the interior arrangement of the clutching mechanism;

Fig. 12 is a plan view showing the arrangement of applicant's measuring device with respect to the grain bin;

Fig. 13 is a front elevation of the structure shown in Fig. 12;

Fig. 14 is a side elevation thereof;

Fig. 15 is a plan view, showing a modification of applicant's grain measuring device and association of same with the combined harvester-thresher;

Fig. 16 is a front elevation thereof, it being noted that the elevator delivers directly into the grain measuring device rather than into an auxiliary receiving and elevating portion; and Fig. 17 is a side elevation showing the general arrangement of applicant's grain measuring device with respect to the grain bin of a combined harvester and thresher.

Before referring specifically to the drawings for a detailed description of the combined harvesting, threshing and grain measuring machine, it has been thought well to trace somewhat generally the history of the present grain harvesting and threshing machines, and the relationship of grain weighing or measuring devices in connection therewith.

Up until a few years ago, the usual manner of harvesting and threshing grain was as follows: A harvesting machine passed through the field, cutting the grain and tying it in bundles, whereupon said bundles were gathered, ordinarily by teams and wagons, and brought to a threshing machine, which was of a stationary type, although same was adapted to be drawn from one field to another. Attached to the threshing machine was a self-feeding arrangement upon which the bundles of grain were manually thrown, with the result that the grain was threshed and delivered, or rather elevated, to a grain weighing device which was attached to the thresher. This grain weighing device was operated simultaneously with the threshing machine, but inasmuch as the thresher maintained a stationary position, the weighing mechanism operated in a satisfactory manner.

Both threshing machines and grain weighing mechanism are so well known and so old in the art as to obviate any necessity of describing same, even generally, for the purpose of showing the operation thereof. It might be added that the grain weighing devices operated upon the gathering of a certain weight of grain in the weighing hopper, whereupon same was discharged, usually automatically, either into a receiving member or into sacks.

The above described grain harvesting and threshing operation was carried on with substantially no change over a long period of years. However, simultaneously with the present age, which tends towards efficiency and therefore the use of machinery, which obviates to a great degree the necessity of manual labor, there appeared the well known combined harvesting and threshing machine, now called a harvester-thresher. These machines revolutionized the harvesting and threshing operations in that the two operations were accomplished simultaneously by a combined machine which passed through the field, at the same time cutting the grain, delivering it to a threshing machine wherein it was threshed, the straw and chaff discharged and the grain delivered either to a large grain bin upon the machine, or to a wagon which was drawn beside the machine.

These machines have been so successful as to permit applicant to say that they are gradually supplanting the old threshing machines and that the efficiency of the harvesting and threshing operation is much increased by the use of same.

These combined harvesting and threshing machines have thus far been handicapped by the fact that there has not been associated therewith a mechanism for measuring the grain simultaneously with the harvesting and threshing operation. It will be apparent that the necessity of measuring or weighing the grain has not been obviated by the use of these combined machines, but at one time or another the farmer must weigh or measure his grain. Prior to applicant's present development, the grain has been taken to one of the well known grain elevating and weighing devices, whereupon it was weighed or measured in the usual manner. Obviously, this additional grain measuring or weighing operation required further labor and time, and decreased to a considerable extent the efficiency of these otherwise superior machines.

The question might be readily asked, why the old grain weighing devices were not carried upon the combined harvester-thresher and the grain weighed in the same manner that it was previously upon stationary threshing machines. This question may be answered easily by the present applicant, in view of the fact that the company of which he is present as well as engineer, has furnished, for a great number of years, a large majority of the grain weighing devices placed upon threshing machines. The old and well known grain weigher, which was associated with the stationary threshing machine depended upon the delivery of a certain weight of grain into a hopper to automatically trip the latter, and discharge the grain therefrom, whereupon the hopper was again in condition to receive a similar grain supply. These grain weighing mechanisms and other similar devices were operated entirely by weight and the adjustments were so delicate as to obviate the use of same upon the combined harvester-threshers which are drawn over the ground in a bumpy fashion, caused by the irregularities in the ground (said irregular movement of the harvester-thresher being adapted to interfere with the delicate weighing mechanism of the grain weigher and causing same, if used, to operate in an inefficient manner as respects the weighing of the grain). In other words, applicant may safely state that the attachment of a well known grain weighing device to a combined harvesting and threshing machine will be absolutely inoperative, as respects the weighing or measuring of the grain.

Applicant, seeing the increased success that attended the use of a so-called combined harvesting and threshing machine, and recognizing the inefficiency of same as respects the grain weighing or measuring operation, commenced the development of the present grain metering or measuring device, which is the result of a long period of experimentation and represents a product which has undergone extensive practical use.

Present applicant, as the records of the Patent Office will show, has been diligent for many years in the development of grain weighing devices for use on stationary threshers, as well as other devices, such as self-feeders and the like, which are also associated with the harvesting and threshing operation.

Applicant recognized, after considerable experimentation, that if an efficient grain measuring device were to be associated with the combined harvester-thresher, which moves through the field, it must not be sensitive to the irregularities of the ground, and therefore could not be a grain weighing device, but rather a grain metering or measuring device.

Inasmuch as the present grain metering or measuring device has been combined with, and will be claimed herein in combination with, a combined harvesting and threshing machine, it has, of course, been necessary to disclose in considerable detail the so-called harvester-thresher. Although there are a large number of harvester-threshers upon the market today, the same being produced by the larger implement companies, applicant's measuring device, with merely a few obviously mechanical changes, may be combined with any of said structures to permit a simultaneous measuring of the grain with the movement of the harvester-thresher through the field. Applicant has chosen one of these harvester-threshers for the purpose of description, but as stated before, it must be understood that this disclosure of one of many devices is merely for the purpose of showing the general combination of applicant's measuring device therewith, and that any of these so-called harvester-threshers might just as well be described.

Inasmuch as harvester-threshers are well known, both in the trade and in the patent art, only such description will be made of same as will insure a clear understanding of the operation of the present grain metering or measuring device in association therewith. In other words, the description of the combined harvester-thresher will be rather general as respects the major portion, and operations thereof, and will not include such detail as might be necessary if the harvester-thresher were to be claimed other than in the general combination with the grain measuring device.

Referring to Fig. 1, there has been shown therein a front elevation of a combined harvesting and threshing and grain measuring device, this view permitting a rather detailed description of the harvesting machine as well as the means of associating same with the thresher in a manner to permit the movement of the combined machine through the field, and hence a simultaneous harvesting and threshing operation.

An axle 10 has a grain wheel 11, disposed upon its outer end in a manner to support the harvesting mechanism, said axle 10, however, having a universal joint connection 12 with a projecting hub portion 13 upon the thresher. In view of the fact that no plan view has been shown of this figure, which would include a detailed description of the auxiliary supporting and bracing means for the harvester, it is thought necessary to say merely that the present drawing is generally of a well known make of combined harvester and thresher and that, due to the universal joint connection disclosed at 12, the harvester unit may have its auxiliary supporting and bracing mechanism removed, with the result that the harvester may be pivoted rearwardly in such manner that it may be drawn in combination with a thresher over an ordinary roadbed.

Obviously, when the harvesting unit is in the position shown in Fig. 1, it could not be drawn over a road, and this figure discloses the operative position of the thresher with respect to the harvesting unit when same is drawn through the field and the grain crop harvested.

The present harvesting unit includes the usual platform 14, a carrier 15, and 15a, reel 16, and other accessories and detail mechanism for connecting and operating such parts, the end of the harvester adjacent the thresher being connected thereto and driven by flexible means, for instance as disclosed at 17. Other driving mechanism for operating the platform, reel and carrier mechanism is provided in the driving and endless chain mechanism disclosed generally at 18 and 19.

As has been stated before, any type of harvesting unit might just as well be shown, but inasmuch as said harvesting units have the same general structural detail, the present disclosure is thought sufficient to show the harvesting unit and the association of same with a threshing machine.

In the above described figure, the carrier is shown delivering the threshed grain into the feeder house 20, which is a part of the threshing machine, the same being perhaps most clearly shown in Fig. 2 of the drawings, which is a perspective view of a threshing machine.

Similarly, with respect to the threshing machine shown, the one disclosed is substantially in every detail a machine which is well known to the trade as well as popular, it being understood, however, that any type of threshing machine having a harvester in connection therewith might just as well be disclosed.

An attempt has been made to show in the perspective view above mentioned the general arrangement of parts within a threashing machine, which will bring out clearly the theory of the threshing operation up to the point where the grain is delivered to the elevator, whereupon same is discharged into the measuring device which applicant has in the present instance combined with the harvesting and threshing machine to produce a new and improved result so far as combined harvesting, threshing and grain feeding devices are concerned.

In view of the fact that applicant is not claiming the harvester and thresher other than in combination with the grain metering or measuring device, a general theoretical description of the grain threshing operation is all that is thought necessary, without including each and every driving connection for the various portions which are conventional in design and which obviously have an endless chain driving connection through various sprockets and clutch mechanisms.

The well known gasoline motor, which provides the power means for the entire unit, is shown at 21, all of the driving connections between the motor and the various parts of the automatically and simultaneously operating combined machine not being disclosed.

The harvested grain is delivered by the carrier 15 and 15a to the feeder house 20. A chain feeding rack 22 delivers the harvested grain to the cylinder 23, and concaves 24. The grain threshed during this operation is deposited upon the grain pan 25, which has such reciprocatory movement as will accomplish the delivery of the threshed grain to the rear end thereof, whereupon it is discharged upon the front end of the chaffer-sieve 26. The arrows indicate the direction of movement of the cylinder, as well as the direction of movement of the threshed grain towards the chaffer-sieve. A beater 27 is disposed slightly above and rearwardly of the cylinder and insures the passage of the straw to the straw racks 28, which, due to their peculiar and forceful movement, discharge same at the rear end 29 of the thresher.

These straw racks 28 are screened in a manner, not shown in the drawings, to permit the passage of grain therethrough and upon either the first named grain pan 25, or a rearwardly disposed grain pan 30, which has such vibratory movement as to deposit the threshed grain upon the forward end of the chaffer-sieve 26. Obviously, this second named grain pan 30 moves in an opposite direction from the first grain pan and in the direction indicated by the arrow.

As stated before, the straw is discharged by the straw racks and the grain which is deposited upon the chaffer-sieve passes therethrough upon a chute 31, which permits the grain to be picked up by the auger 32 and carried to the elevator 33. A fan 34 is supported within a housing 35 in a manner to direct a considerable blast upon the grain which is deposited upon the chaffer-sieve, said blast being sufficient to blow any of the chaff out of the end of the machine, but not sufficiently strong to carry any of the grain with it.

The continuously moving elevating portions 36 within the elevator 33 carry the grain upwardly to a grain distributing auger 37, which in turn distributes the grain evenly over an upper sieve 38. Said upper sieve 38 co-operates with a perforated lower sieve 39 in a manner to thoroughly reclean the grain, the same being in the path of an air blast which is delivered by an encased second fan member 40, similar in substantially all respects to the first named fan 34. This blast also is sufficient merely to blow off any extraneous matter still mingled at this time with the threshed grain, and discharge same into a conveying auger 41, which in turn delivers the material blown from the grain into an elevator portion generally described as 42, which again delivers this extraneous matter, which undoubtedly carries a small portion of grain, through the chute 43 into the grain house 20, where the grain and other matter is again delivered to the cylinder for a rethreshing operation. The thoroughly cleansed grain delivered from the recleaning sieves 38 and 39 is deposited upon a chute 44, where it is picked up by a conveying auger 45, and carried to the boot of a substantially vertically disposed elevator 46, not shown in the perspective view, but in Fig. 1 of the drawings, as well as in one or two other figures.

This elevator 46 is of conventional construction and includes the grain elevating mechanism therewith as well as a discharge spout 47 at its upper end. From the spout 47 of the vertically disposed elevator 46 is discharged the threshed grain which is received by the grain metering or measuring structure now to be described.

From the measuring device, the grain is discharged into a grain bin 48, which is suitably supported by means of framing 49 and various supporting members, one of which is shown at 50 in the drawings. This grain bin is of considerable capacity, there being disclosed a discharge spout 51, which permits the contents of same to be removed as desired. A suitable framing 52 supports the threshing machine, said frame being carried by the conventional wheel members 53.

As stated before, all the driving connections for the various elements of the threshing machine have not been shown, inasmuch as the description is thought clearly sufficient, so far as a combined harvester and thresher is concerned, and the operative association therewith of an automatically operating grain metering or measuring device.

It might be stated at this time that in some instances it might be desirable to dispose the grain metering or measuring device, now to be described, in a manner to receive the grain discharged from the elevator 46 and to thereafter discharge such grain from the measuring device into discharge spouts, which lead either to a wagon drawn at the side of the combine, or into grain bags, thus dispensing with the grain bin. However, under ordinary circumstances, the grain bin has been found to be the most practical grain receiving receptacle, and is supported on the threshing machine in such manner as not to disturb the equilibrium of the entire machine.

As far as the operation of the harvester-thresher is concerned, it is apparent that the movement of the combined harvester and thresher through the field results in the cutting of the stalks, the delivery of the harvested grain to the threshing machine, and thereafter threshing of the grain to a point where the completely threshed grain is delivered to the vertically disposed elevator, whereupon and simultaneously therewith, the grain measuring operation now to be described is accomplished.

The above description of the operation of the combined harvester-thresher is thought clear, so far as the harvesting and threshing operations are concerned, and the elevation of the grain to a point where same is discharged into the grain bin.

Applicant has disclosed in detail herein a grain metering or measuring device that is adapted to be associated with a combined harvester-thresher of the type described, it being necessary, due to the association of the grain elevating mechanism with the grain bin, to utilize an auxiliary and somewhat smaller grain elevating mechanism in connection with the measuring device itself, it being stated at this time, however, and as a matter of fact shown, in Figs. 15, 16 and 17 of the drawings that the use of this auxiliary elevator is unnecessary in case, we will say, where the combined harvester-thresher includes a grain elevating structure of a nature that will deliver directly into the measuring device, which is disposed beneath the spout thereof and above the grain bin.

Referring to Figs. 12, 13 and 14, the manner of disposing applicant's measuring device with respect to the grain elevator on the harvesting and threshing machine, and the grain bin, is clearly disclosed. The measuring device structure is shown supported on the framing members 75 and 76, which are securely attached to the upper side of the grain bin.

The measuring device is made up of the following portions: A receiving portion 77 is disposed directly beneath the discharge spout 78 of the elevator that is connected with the harvester-thresher, said receiving portion containing a screw conveyor 79 therein. This screw conveyor has its bearing supports in either end of the receiving member 77, as shown at 80. As a matter of fact, one end of the shaft designated 81, upon which the screw conveyor is mounted, is projected outwardly as at 82, and upon the end thereof is securely fastened a sprocket wheel 83, the same providing, through the chain member 84, the driving mechanism for the grain metering or measuring device. Rising from the receiving portion 77, is a housing member 85, in which is disposed the conventional continuously operating elevating sections 86 adapted to deliver the grain from an elevated position through the spout 87. The spout 87 directly overlies the grain metering or measuring mechanism now to be described.

A skeleton framing portion, substantially box-like in shape, is shown at 88. This framing is also connected with the auxiliary elevator and receiving portion in a manner to securely hold same, and as a matter of fact is the framing which is attached to the before-described cross bars or framing portions 75 and 76 connected to the grain bin and holding the grain weighing mechanism disposed thereon.

Within the framing 88 is disposed a hopper 89, beneath which, and as a matter of fact forming a part thereof, is a grain metering or measuring device, which comprises a six-vaned grain meter or measuring device 90. This member 90 is disposed in the bottom of the hopper 89 in a manner to form a movable lower portion thereof, the outer ends of same being closed by means of the end pieces 91 and 92. A horizontally disposed rod 93 provides the axis of the meter and the projecting ends thereof are carried in bearings 94 and 95 which are in turn carried in the end plates 96 and 97 of the hopper 89. The meter 90 is enclosed both forwardly and rearwardly by plates 98 and 99 respectively, which are also securely attached to the hopper 89. These plates 98 and 99 are not connected at their lower ends, but as a matter of fact, leave a discharge opening 100 which permits the grain carried by the measuring device to be discharged directly into the grain bin.

The combined hopper and grain measuring device connected therewith has a tensioned pivotal mounting within the skeleton framing 88. The pivot point for the hopper is shown at 101, said pivotal connection comprising a bracket 102 secured to the metering device and hopper, and a bracket 103 secured as at 104 to the skeleton framing and the before-described pivotal connection 101. Means for holding the hopper and measuring device in a tensioned relation with respect to the skeleton framing 88 is found in the coil spring 105, which has its end 106 connected to a bracket 107, which is securely attached to the upper portion of hopper 89. The offset end of the coil spring 105 has an adjustable engagement 108 with another bracket 109 secured, as at 110, to a part of the skeleton framing.

The above described pivotal and tensioned mounting of the hopper within the skeleton framing is controlled, as respects the up and down movement of the hopper 89 within the skeleton framing, by stop members 111 and 112 which actually compose one bracket that is secured as at 113 to the hopper, slotted portion 114 thereof being adapted to receive therein an inwardly projecting portion 115 actually a part of the skeleton framing.

It is apparent that the pivoted and tensioned hopper and grain measuring device has a limited up and down movement.

Before describing the remaining portions of the grain measuring device, it might be stated that this raising and lowering of the hopper and grain measuring device is utilized as a means for operating a clutch member later to be described, which in turn controls the movement of the measuring device.

In Fig. 8, upon one end of the rod 93, which comprises the axis of the meter 90, is found a clutch mechanism generally described as 116. This clutch, which will later be described in detail, is a conventional implement clutch, the same having an upstanding portion 117 which is adapted to be engaged by an outwardly projecting lug 118 secured as at 119 to the skeleton framing 88.

Turning to Fig. 6, there may be readily seen in side elevation the exact position of this lug 118 with respect to the clutch, it being readily apparent that the downward movement of the hopper 89 and measuring device, the same being permitted, due to the pivoted and tensioned mounting, will permit a release of the member 117 by the lug 118 and therefore such clutching action as will allow the rotation of the shaft 93 and therefore the operation of the grain measuring device.

Similarly, when the hopper and grain measuring device rise sufficiently to permit re-engagement of the lug 118 with the member 117 of the clutch, movement of the shaft 93 will be stopped, due to the fact that the clutch is now held in unclutched relationship.

Referring specifically to the clutch, which as stated before is of a conventional implement type, the same includes a sprocket wheel 120, which is loosely mounted upon the shaft 93, the actual clutching portion being disposed adjacent thereto. Said clutching portion comprises a bracket 121 securely pinned, as at 122, to the shaft 93. Pivoted, as at 123, to the clutch portion 121 is a pawl 124 held in a tensioned manner by means of a spring 125 attached to the plate 126, the same carrying the upwardly projecting portions 117 which are adapted, as stated before, to be engaged by the projecting lug 118 on the framing 88. This spring tensioned connection of the pawl 124 with the plate 126 carrying the portions 117 permits an inward movement of the pawl 124 with respect to the dogs 127 on the interior of the sprocket 120, whenever the portion 117 is engaged by the lug 118 on the skeleton framing. However, when the portion 117 is not engaged by the lug 118, the pawl 124, due to its spring tension mounting is permitted to move outwardly and to engage one of the dogs 127 on the interior of the sprocket 120. In other words, whenever the portion 117 is held in a retarded position by lug 118, the metering device, or rather the sprocket 120, is held in an unclutched position. However, whenever the hopper 89 and metering device move downwardly in a manner to release the member 117, the pawl 124 will engage the dogs 127 on the interior of the sprocket 120 and therefore clutch the sprocket 120 to the shaft 93, causing same to be rotated, this in turn causing rotation of the meter or measuring device 90.

Means for holding the sprocket 120 in tensioned relation with the clutch mechanism just described is provided in a coil spring 128, there being a washer 129 disposed between the coil spring and the clutch and a pin 130 holding the spring in position. The above described clutch is efficient, as well as fairly quiet in operation, and accomplishes the clutching operation of the metering device, the same being controlled by the upward or downward movement of the hopper, which, as later will be described, is influenced by the volume of grain discharged from the elevator associated with the threshing machine into the hopper 89.

Further, with respect to the hopper 89 and metering device, it is seen that plate 99 which surrounds a portion of the meter 90 is spaced sufficiently closely with the meter 90 as to prevent passage of grain during the filling of the various portions of the meter. However, inasmuch as the meter rotates in a counter-clockwise direction, there has been disposed upon the opposite side of the meter a plate 131 which is in the nature of a safety plate, as same is adjustably connected, as at 132, with a horizontally disposed portion 133, the same having a pivotal mounting 134. This member 133 is held in a normally fixed but tensioned position by means of coil springs 135, the same being connected, as at 136, with the member 133 and as at 137 with the bracket 102 which is one of the pivotal portions of the hopper and measuring device.

As respects the safety feature of the plate 131, the same, in the first place, is adapted to be adjusted away from and towards the edges of the plural vanes which make up meter 90. This is for the reason that various grains may be harvested and threshed, and when small grains are measured, the plate must be disposed very close to the edges of the vanes in the metering device to prevent the passage of the grain therethrough prior to the measuring operation. Without adjustment, this, of course, would prevent accurate measuring of the various grains and for this reason the plate 131 has an adjustable mounting with respect to the portion 133. The pivotal and tensioned mounting of the plate 131 is, as stated before, for the purpose of further safety, in that in some instances extraneous matter such as rocks, etc., might be discharged into the hopper and be caught between the edges of the vanes in the meter 90 and the plate 131. In case this plate were not movable under such pressure, damage to the measuring device might, and probably would, result. However, in case anything is wedged between the vanes and this plate 131, the latter is permitted to move slightly to allow the passage thereunder of such extraneous matter.

From the above description, the operation of the measuring device is thought sufficiently clear as respects the upward and downward movement of the hopper and meter, influenced by the volume of grain and subsequent clutching and unclutching operation of the clutch which is controlled by the lug 118 projecting from the skeleton framing.

Means for driving the sprocket 120 and therefore the measuring device, is found in the chain portion 138, said chain engaging a sprocket 130 which is secured to the end of a horizontally disposed intermediate or counter drive shaft 140, the same being supported in brackets 141 which are secured to the skeleton framing 88. This auxiliary drive shaft has an adjustable mounting, as shown at 142, to permit adjustment of the chain 138 which is necessary whenever there is adjustment of the movement of the hopper 89 and measuring device, such adjustment obviously being accomplished through adjustment of the coil spring 105 by manual movement of the portion 108 in connection therewith.

The driving connection for the auxiliary sprocket 139 is found in the before-described chain 84 which engages the previously mentioned sprocket 83, the latter being fixedly secured to the outer end of the shaft 81, which provides the axis for the grain conveying auger 79.

As far as the driving connection for the shaft 81 is concerned, it is apparent that the elevating portions are carried at their lower ends upon the sprocket 143, which is secured to the shaft 81, which in turn provides one of the driving connections for the metering device above described.

A similar conventional sprocket 144 in the upper end of the auxiliary elevator section carries the elevating portions at that end, said sprocket being secured to a drive shaft 145 having bearing supports in the elevator housing as well as an auxiliary bearing support 146 supported by means of a vertically disposed rod 147 fixedly secured at its lower end to the framing 148 surrounding the upper portion of the receiving portion 77.

A sprocket 149 is loosely mounted on the shaft 145 and conventional clutching mechanism 150 disposed adjacent thereto permits a clutched or unclutched relationship of sprocket 149 with drive shaft 145. Any conventional chain mechanism, not shown, may be connected with any moving portion of the thresher and with the sprocket 149, to provide transmission of power to the drive shaft 145 and consequently to the auxiliary conveyor, the auger 79 in the receiving portion and through the previously described chain and sprocket mechanism to the grain metering and measuring device.

There have now been described those portions of the grain metering device which permit actual measuring of the grain when discharged into the hopper 89, it being apparent that when the hopper is adjusted, through the coil spring 105, same will not move downwardly to permit operation of the meter 90 until a certain and determined volume has been discharged into the hopper 89.

It might be stated that the pivotally mounted hopper is tensioned in such manner that same will move downwardly only when a rather considerable volume of grain has been discharged thereinto, therefore rotation of the meter is absolutely prevented unless there is an overabundance of grain in the hopper to completely fill the receiving or vane portions of the meter, as they are continuously or intermittently rotated. Therefore, it is plain that the grain measuring device is not operated directly by the filling of the vanes in the grain meter, thereafter depending upon weight to trip the clutch and cause it to rotate, but there must always be a considerable volume of grain in the hopper to permit actuation of the metering device, which will in turn be insured of full capacity for the plural vane portions at all times. Hence, although it is necessary to have a certain weight or volume of grain in the hopper, nevertheless the grain actually in the hopper is not weighed but same merely permits actuation of the measuring device which is assured of delivering a certain amount during each rotation or partial rotation. When the volume of grain decreases beyond the determined point, the metering device immediately ceases operation until the hopper is refilled to the proper point. Thus, it may be clearly seen that the passage of the combined machine through the field, with a consequent irregular travel, will not affect the operation of the metering device in the least, inasmuch as same will not operate unless there is a determined volume of grain in the hopper, which insures full feed for the metering device.

Means for keeping track of the amount of grain threshed and delivered by the measuring device is provided in the following mechanism: Secured to one of the projecting ends of the shaft 93 which is the axis for the meter, there is an actuating member 151, adapted to move an adjacent sprocket 152 pivotally attached to one side of the meter, as at 153. The sprocket 152, has such a concave fashioning 154 between the sprocket portions as to permit engagement therewith, during the turning movement of the cam like portions 155, which lie adjacent the actuating portion 151. In other words, the actuator 151 is adapted to move the sprocket, but in order to permit the even travel of the sprocket with respect to the actuating portions, the cam portion 155 is adapted to engage the concave portions 154 on the sprocket to insure such desired even travel. A pitman 156 is pivoted, as at 157, upon the sprocket, said pitman being connected as at 158 at its opposite end with an operating member 159 of a conventional tally 160. This tally 160 is so conventional in design as to obviate the necessity of describing same in detail. It is merely a tallying device which registers each rotation or partial rotation of the metering device, and therefore the actual amount of grain which is delivered to and discharged from the measuring device. This register is well known in grain weighing devices of all kinds, as well as numerous other continuously operating weighing structures. To go into a minute description of this register would involve considerable detail, which is not thought necessary in view of its well known use.

Applicant has described in detail his grain metering or measuring device when same is associated with an auxiliary elevator, same having a receiving portion into which the elevator upon the thresher is adapted to discharge.

In Fig. 1, which is a front elevation of a combined harvester-thresher and grain measuring device, the grain measuring structure has been shown without the auxiliary elevator member, and it is apparent that when the elevator upon the threshing machine is of sufficient length to discharge directly into the grain metering device, which is disposed above and partially within the grain bin, there is no necessity of having the auxiliary elevator. As a matter of fact, applicant, in developing his present structure, was forced to construct his grain metering device in conformity with the type of grain harvester and thresher which has been sold to the trade for some years, and upon which the grain elevator is merely raised to a point where it discharges directly into the bin, and for this reason applicant, as stated before, was forced to provide an auxiliary elevator. As far as the grain measuring structure is concerned, it is readily apparent that same might just as well be disposed directly beneath the conventional elevator on the thresher, and therefore obviate the necessity of the described auxiliary elevator. As a matter of fact, in several figures of the drawings, namely 15, 16 and 17, a grain metering device which is an exact duplicate of the one heretofore described, with the exception of the auxiliary elevator, is disposed directly beneath the discharge spout of the conventional elevator on the threshing machine, and as a matter of fact operates in just as efficient a manner. It will be noticed in these figures, however, that the grain elevator, which is associated with the threshing machine, is elevated considerably above the grain bin and in a manner to discharge directly into the hopper of the grain metering device. The only difference in the arrangement of the grain measuring device shown in these figures is that the driving connection is directly from the head of the elevator, and as a matter of fact even such type of drive might well be changed to the grain metering device, and power for the grain measuring device taken from any part of the thresher. These views disclosing a similar grain measuring device, without the elevator, have been shown for the reason that in the future it is very possible that the combined harvesting, threshing and grain measuring machines will be constructed in a manner to obviate the auxiliary elevator.

It has not been thought necessary to go into a detail description of these figures, in view of the fact that the grain metering device has been described in detail, and it is readily apparent that same operates upon the discharge of a determined volume of grain in the hopper, whereupon same moves downwardly in a manner to operate the clutch and therefore commence operation of the grain metering device, which discharges a given volume of grain upon each partial revolution. Applicant has not stated the capacity of his measuring device, inasmuch as same might readily be varied. However, it is apparent that during rotation of the meter, each of the plural vane portions must be entirely filled before the meter can rotate and that once filled only a given quantity, the same being measured by the capacity of the various portions of the meter, can be discharged into the grain bin.

What I claim is:

1. A device of the character described having in combination, a threshing unit, means for conveying grain to be threshed into the threshing unit while the latter is in transit, a grain measuring device mounted on the thresher unit for measuring the threshed grain while the thresher unit is in motion, and a storage receptacle on the device for receiving and storing the measured grain.

2. In combination, a thresher unit having a grain bin and an elevator adapted to deliver the threshed grain therein, and a grain metering device disposed between the elevator and the grain bin for automatically measuring the grain before it is discharged into the bin, said metering device operating on the volumetric principle and being particularly adapted to measure grain while said thresher is in motion.

3. In combination, a movable thresher unit including a grain bin and an elevator adapted to deliver threshed grain therein, and a grain metering device disposed between the elevator and grain bin, said device being adapted to measure and deliver a determined volume of grain at each cycle of operation thereof while the thresher unit is in transit and irrespective of ground irregularities.

4. In combination, a movable thresher unit including a grain bin and an elevator adapted to deliver threshed grain therein and a grain measuring device disposed between the elevator and grain bin and operatively connected with the thresher unit, said metering device including a clutch controlled measuring portion operative upon the accumulation of a determined volume of grain, and being adapted to deliver a measured quantity of grain at each cycle of operation thereof to the bin while the thresher unit is in transit.

5. In combination, a thresher unit including a grain receiving receptacle and an elevator adapted to deliver threshed grain thereto, means for conveying unthreshed grain to the thresher unit, and means disposed between the elevator and the grain receiving receptacle for measuring the threshed grain by volume as it passes into the said receptacle and while the threshing unit is in transit, the said receptacle having substantially large capacity.

6. In combination, a movable thresher unit adapted to travel through a field of grain, said thresher unit including a grain elevating device, a receptacle for receiving the threshed grain delivered by the grain elevating device, and mechanism adapted to measure the grain by volume in its passage from the elevator to the receptacle.

7. In combination, a movable thresher unit including a grain elevating device for the threshed grain, a grain receiving receptacle, means for continuously measuring the grain by volume prior to its delivery into the receptacle, the said measuring means being adapted to accurately measure the grain in transit irrespective of vibration due to irregular contour of the ground over which the thresher unit travels.

8. In combination, a movable thresher unit having a receptacle for receiving the threshed grain, an elevating device for delivering the threshed grain to the receptacle, and a grain measuring device located between the elevating device and the receptacle, the measuring device including a hopper member and a grain meter associated therewith, the meter being constructed to operate only when such volume of grain is contained in the hopper as would insure the delivery of a determined amount of grain by the meter, the grain measuring device being mounted upon and moving with the thresher unit, and particularly adapted to operate irrespective of vibration incident to the travel of said thresher over a grain field.

9. In combination, a movable thresher unit including a grain receiving receptacle and an elevating device for conveying threshed grain thereto, a grain metering device operatively connected with the thresher unit and adapted to operate while the latter is in transit, the metering device being adapted to operate automatically upon the accumulation therein of a determined volume of grain, and to deliver measured grain to the said receiving receptacle.

10. In combination, a movable thresher unit including a grain receiving receptacle and an elevating device for delivering threshed grain thereto, a grain measuring device adapted to operate upon the grain while the thresher unit is in transit, said metering device being disposed between the elevator and the grain receiving receptacle, the measuring device comprising a rotatable metering unit adapted to receive the grain from the elevator, means for operating the metering unit from the thresher unit, and an automatically operated clutch member controlled by the accumulation of a predetermined volume of grain in the metering unit, said clutch mechanism controlling the movement of the metering unit and insuring the delivery of a measured volume of grain, irrespective of vibration incident to movement of said thresher.

11. In combination, a thresher unit, means for continuously feeding unthreshed grain to said unit while the thresher unit is in transit, means mounted upon the thresher unit and operatively connected therewith for continuously measuring the threshed grain by volume while the thresher unit is in transit, and means for storing the threshed and metered grain.

ARTHUR J. HARTLEY.